(12) United States Patent
Vijayakumar

(10) Patent No.: US 7,998,259 B2
(45) Date of Patent: Aug. 16, 2011

(54) COMBINATION HIGH EFFICIENCY PARTICLE AND GAS FILTER

(76) Inventor: Rajagopal Vijayakumar, Liverpool, NY (US)

( * ) Notice: Subject to any disclaimer, the term of this patent is extended or adjusted under 35 U.S.C. 154(b) by 197 days.

(21) Appl. No.: 12/355,566

(22) Filed: Jan. 16, 2009

(65) Prior Publication Data

US 2009/0183635 A1     Jul. 23, 2009

Related U.S. Application Data

(60) Provisional application No. 61/021,751, filed on Jan. 17, 2008.

(51) Int. Cl.
*B01D 53/04* (2006.01)
(52) U.S. Cl. .......................... 96/135; 96/134
(58) Field of Classification Search ............ 96/134, 96/135
See application file for complete search history.

(56) References Cited

U.S. PATENT DOCUMENTS

| | | | | | |
|---|---|---|---|---|---|
| 3,873,287 | A | * | 3/1975 | Barnebey | 96/129 |
| 4,412,849 | A | * | 11/1983 | Shahani | 95/273 |
| 5,607,647 | A | * | 3/1997 | Kinkead | 422/122 |
| 5,626,820 | A | * | 5/1997 | Kinkead et al. | 422/122 |
| 5,714,126 | A | * | 2/1998 | Frund | 422/122 |
| 6,156,089 | A | * | 12/2000 | Stemmer et al. | 55/467 |
| 6,726,751 | B2 | * | 4/2004 | Bause et al. | 96/134 |
| 7,052,532 | B1 | * | 5/2006 | Liu et al. | 96/154 |
| 7,258,717 | B2 | * | 8/2007 | Duffy | 55/497 |
| 2005/0262818 | A1 | * | 12/2005 | Stenersen | 55/482 |

* cited by examiner

*Primary Examiner* — Robert J Hill, Jr.
*Assistant Examiner* — Christopher P Jones
(74) *Attorney, Agent, or Firm* — George R. McGuire; Frederick J. M. Price; Bond Schoeneck & King

(57) ABSTRACT

The present invention relates generally to particle removal and air borne molecular contaminant air filters, and, more particularly, to a combination particle and air borne molecular contaminant filter with an activated material separator.

4 Claims, 5 Drawing Sheets

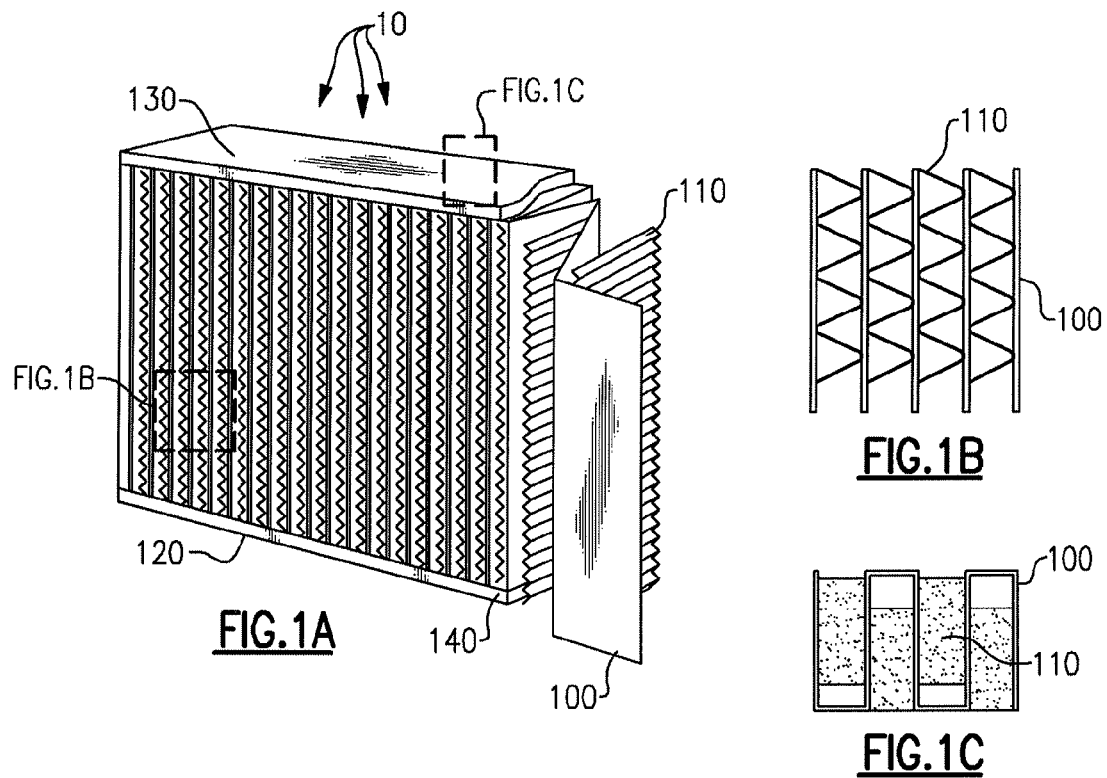
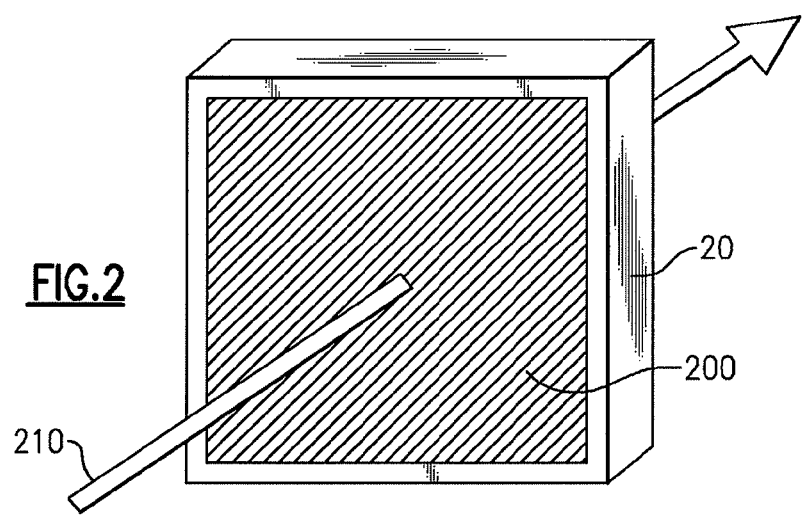

COMBINATION HIGH EFFICIENCY PARTICLE AND GAS FILTER

RELATED APPLICATION

The present application claims priority to U.S. provisional patent application No. 61/021,751, filed on Jan. 17, 2008, which is hereby incorporated by reference herein in its entirety.

BACKGROUND OF THE INVENTION

1. Field of Invention

The present invention relates generally to particle removal and air borne molecular contaminant air filters, and, more particularly, to a combination particle and air borne molecular contaminant filter with an activated material separator.

2. Description of Prior Art

Cleanliness of air supplied to clean rooms and other confined environments depends on air filters to remove contaminants in the air. Particle contaminants are typically removed by using air filters with particle removal efficiencies ranging from about 95% to 99.9999+%. A conventional high efficiency particle filter 10, for example, is schematically shown in FIGS. 1a-c.

High efficiency particle filters 10, such as HEPA or ULPA air filters, are constructed by pleating a continuous sheet of flat filter media 100 into an accordion style construction, as shown in FIGS. 1a-c.

FIG. 1a is a front view of a particle filter 10, which shows the continuous sheet of flat filter media 100 separated by separators 110 and enclosed within a filter frame 130 on the top, bottom, and left and right sides. The front and back (not shown) sides are open to allow air to pass through the filter 10. FIG. 1a also shows a gasket seal 120 and adhesive bond 140 between the filter media 100/separator 110 and integral filter frame 130.

FIG. 1b is a front expanded view of a portion (portion "A") of the particle filter 10 as shown in FIG. 1a.

FIG. 1c is a top expanded view of a portion (portion "B" without the top part of the frame 130) of the particle filter 10 as shown in FIG. 1a.

The pleating of the filter media 100 allows a large amount of the filter media 100 to be packed into a small geometric shape, increasing surface area and thus the performance of the filter. The pleats are kept apart by separators 110 so that air can freely pass through each pleat without causing the pleats to lose their geometry or spacing, both of which would adversely affect filter 10 performance.

The oldest, and still quite common, method of pleat separation is by means of corrugated sheet separators 110 made from thin gage aluminum, as shown in FIGS. 1a-b. These separators 110 are made as thin as possible to avoid blocking the airflow. In this construction, the corrugated sheet separators 110 not only maintain (keeps intact) the geometry and the structure of the pleated filter media 100, but since the separators 110 are in intimate contact with the air flow, the separators 110 also aid in the optimum distribution of the air throughout the depth of the filter 10.

With the decreasing scale of the tolerable defects and contaminants in processes taking place in a typical clean room and other confined environments, the emphasis is shifting from the filtering of particles to the removal of air borne molecular contaminants (AMC). This is particularly true in the microelectronics, biotechnology, and the newly emerging area of Nano technology and manufacturing, where the dimensions of components and products are approaching molecular sizes. AMCs and other gaseous contaminants are usually removed by passing the air through packed beds of activated materials 200 such as activated charcoal, which is schematically shown in FIG. 2. The activated material 200 is often impregnated with other chemicals to remove specific AMCs such as acids or bases. It is common for the particle and AMC filters to be mounted in series such that the combination of such filters removes both particle and gaseous contaminants. The effectiveness of removal is controlled by the amount of the activated material packed in the box and by the efficiency of the particle filters.

Removal of AMC requires intimate contact between the air stream 210 and the activated material 200, as shown in FIG. 2. In this conventional set-up, which is cumbersome and bulky, a box 20 is filled with the activated material 200. The intricate airflow 210 through the grains of the activated material 200 provides the required intimate contact.

Combination particle and AMC filters are not conventional. For example, in one current attempt to produce such a combination filter, a thin web of fibers made with the activated material was used as a pre-AMC filter to a conventional particle filter set up in series. However, in this case, due to the small quantity of material than can be included in the web of fibers used as the pre-AMC filter, the effectiveness and the life of such webs are poor.

SUMMARY OF THE INVENTION

It is therefore a principal object and advantage of the present invention to overcome the aforementioned shortcomings of the prior art.

It is an additional object and advantage of the present invention to provide a combination particle and AMC filter that does not need to be separately mounted in series (as compared with the conventional systems) to remove particle and gas contaminants.

It is a further object and advantage of the present invention to provide a combination particle and AMC filter that can use an amount of activated material, which can provide a more effective removal of AMC as compared with conventional systems.

It is another object and advantage of the present invention to provide a combination particle and AMC filter that can be significantly more effective at removing particle and gas contaminants than current practice, and more compact than using separate particle and AMC filters.

In accordance with the foregoing objects and advantages, an embodiment of the present invention provides a combination particle and AMC filter that incorporates significant quantities of activated material into the construction of a particle filter. In accordance with a preferred embodiment of the present invention, a combination particle and AMC filter is provided as a single filter construction that incorporates significant quantities of activated material into a separator portion of a particle filter with minimal or no loss of filter effectiveness or life span. An embodiment of the present invention is based, in part, on the intimate contact between the air and the activated material separator in a pleated filter media construction to form the combination particle and AMC filter.

BRIEF DESCRIPTION OF THE DRAWINGS

The present invention will be more fully understood and appreciated by reading the following Detailed Description in conjunction with the accompanying drawings, in which:

FIGS. 1a-c are schematic views illustrating a conventional high efficiency particle filter including pleated air filter media and corrugated separators.

FIG. 2 is a schematic view illustrating a conventional AMC filter showing the removal of AMCs and other gaseous contaminants from the air, by passing the air through a box with packed beds of activated materials such as activated charcoal.

DETAILED DESCRIPTION

Figure 3A:
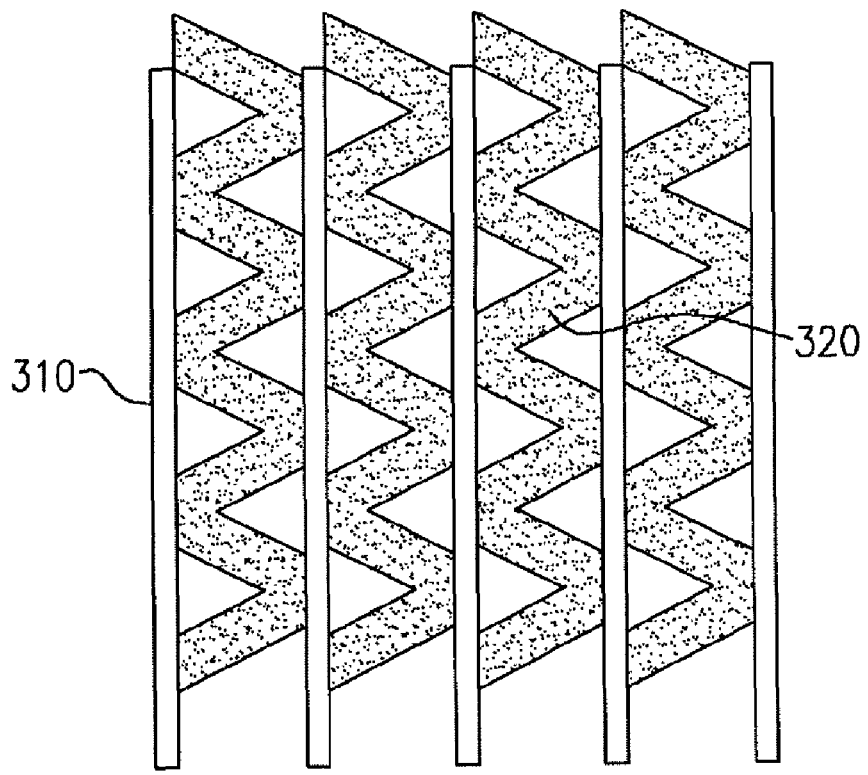
FIG. 3a-b are schematic views illustrating a portions of a combination particle and AMC filter with an activated material separator, in accordance with an embodiment of the present invention.

Reference will now be made in detail to the present preferred embodiments of the invention, wherein like reference numerals refer to like components, examples of which are illustrated in the accompanying drawing.

In accordance with an embodiment of the present invention, a combination particle and AMC filter is provided that takes advantage of the construction of a particle filter to incorporate the materials capable of removing AMCs. These materials are generally categorized as activated material. This activated material includes, but is not limited to, activated carbon, alumina silica, or similar material, and the like. These materials can also be impregnated with other chemicals to remove specific AMCs, e.g., impregnation with potassium iodide acting as a catlyst, for catalytic hydrogen sulfide oxidation to elemental sulfur, phosphoric acid impregnation for removal of Ammonia, potassium iodide for acid removal, and others (as should be appreciated by those skilled in the art). Other impregnation materials can include those shown in Table 1 below, (not limited by amount or other factors as shown) which is taken from K. D. Henning et al., *Impregnated Activated Carbon for Environmental Protection*, GAS SEPARATION & PURIFICATION, 1993, vol. 7, no 4 (9 ref.), pp. 235-240, which is hereby incorporated by reference herein in its entirety. According to Henning et al., this table contains a list of frequently used products as well as information on the quality and quantity of the impregnation agents, the basic activated carbon qualities used, and the relevant application fields.

TABLE 1

| Impregnation | | | |
|---|---|---|---|
| Chemicals | Quantity (wt %) | Activated Carbon[3] | Examples for application |
| Sulfuric acid | 2-26 | F 1-4 mmØ | Ammonia, amine, mercury |
| Phosphoric acid | 10-30 | F 1-4 mm Ø | Ammonia, amine |
| Potassium carbonate | 10-20 | F 1-4 mm Ø | Acid gases (HCl, HF, $SO_2$, $H_2S$, $NO_2$), carbon disulfide |
| Iron oxide | 10 | F 1-4 mm Ø | $H_2S$, mencaption COS |
| Potassium iodide | 1-5 | F 1-4 mm Ø | $H_2S$, $PH_3$, Hg, $AsH_3$, radioactive gases/radioactivemethyl iodide |
| Triethylene diamine (TEDA) | 2-5 | F 1-2 mm Ø G 6-16 mesh | Radioactive gases/radioactivemethyl iodide |
| Sulfur | 10-20 | F 1-4 mm Ø, G | mercury |
| Potassium permanganate | 5 | F 3 + 4 mm Ø | $H_2S$ from oxygen-lacking gases |
| Manganese IV oxide | | G 6-16 mesh | Aldehyde |
| Silver | 0.1-3 | P 3 + 4 mm Ø G 6-30 mesh | P: phosphine, arsine G: domestic drinking water filters (oligodynamic effect) |
| Zinc oxide | 10 | F 1-4 mm Ø | Hydrogen cyanide |
| Chromium-copper-silver salts | 10-20 | F 0.6-3 mm Ø G 12-30 mesh G 6-16 mesh | Civil and military gas protection Phosphine, chlorine, arsine Chloropicrin, sarin and other nerve gases |
| Mercury II chloride | 10-15 | F 3 + 4 mm Ø | Vinyl chloride synthesis Vinyl fluoride synthesis |
| Zinc acetate | 15-25 | F 3 + 4 mm Ø | Vinyl acetate synthesis |
| Noble metals (palladium, platinum) | 3-5 | F, G, P | Organic synthesis hydrogenation |

Figure 3B:
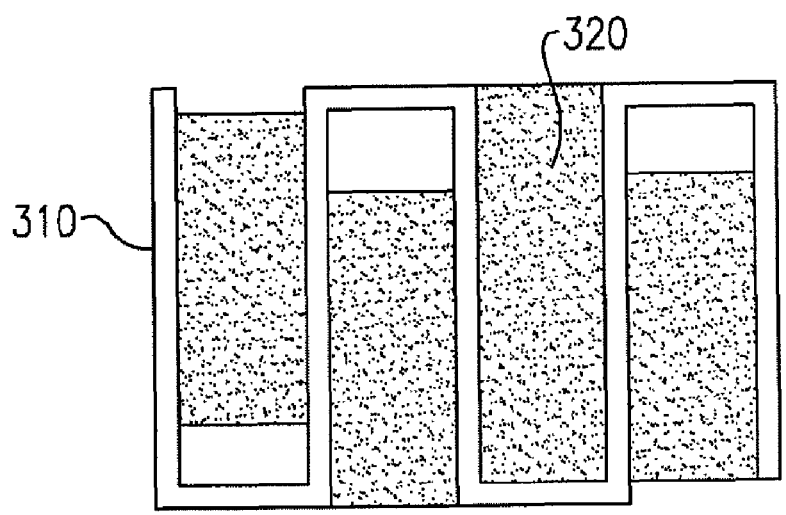

F = pelletized activated carbon
G = granulated activated carbon
P = powdered activated carbon
Ø = pellet diameter Turning to FIGS. 3a-b, schematic views illustrating portions of a combination particle and AMC filter 300 with an activated material separator 320 are shown, in accordance with an embodiment of the present invention.

FIG. 3a is a front expanded view of a portion of a combination particle and AMC filter 300 with an activated material separator 320 (FIG. 3a is similar in view as the view shown in FIG. 1b). For clarity only the media pleats 310 and the activated material separator 320 are shown, and a front view of a combination particle and AMC filter 300, which has the continuous sheet of flat filter media 310 separated by activated material separators 320 and enclosed within a filter frame on the top, bottom, and left and right sides (with front and back sides of the combination particle and AMC filter 300 being open to allow air to pass through the filter 300) is not shown.

FIG. 3b is a top expanded view of a portion of a combination particle and AMC filter 300 with an activated material separator 320 (FIG. 3b is similar in view as the view shown in FIG. 1c). Again, for clarity only the media pleats 310 and the activated material separator 320 are shown.

In accordance with an embodiment of the present invention, the filter media 310 is similar to the accordion style filter media 100 as shown and described with reference to FIGS. 1a-c, the description of which is incorporated herein by reference in its entirety.

In accordance with an embodiment of the present invention, the pleats of the filter media 310 are kept apart by separators 320 formed from the activated material so that air can freely pass through each pleat without causing the pleats to lose their geometry or spacing. The activated material separators 320 can be manufactured by machining, or by molding, extruding or casting, as described below. The activated material separators can be impregnated with other chemicals to remove specific contaminants, as described above. Preferably, the activated material separators 320 are corrugated sheets as shown in FIG. 3a, but are not required to be corrugated (as it should be understood by those skilled in the art that not all types of activated material may be readily formable into corrugations). As opposed to the thinner and impervious aluminum separators used in conventional air particle filters, the activated material separators 320 can be significantly thicker due to the separators' 320 porosity without significantly blocking the air flow through the filter 300.

In accordance with an embodiment of the present invention, the combination particle and AMC filter 300 takes advantage of a filter construction to facilitate an intimate contact between the activated material and the air flow. This construct facilitates removal of gaseous AMC in an air stream due to the intimate passage through or over the activated material. The combination particle and AMC filter 300 is structured to provide such removal by replacing the aluminum, paper, plastic or other corrugated separators common in conventional filter constructions with corrugations made with the activated material (as discussed above). The application of the corrugation is further illustrated in FIG. 4.

Figure 4:
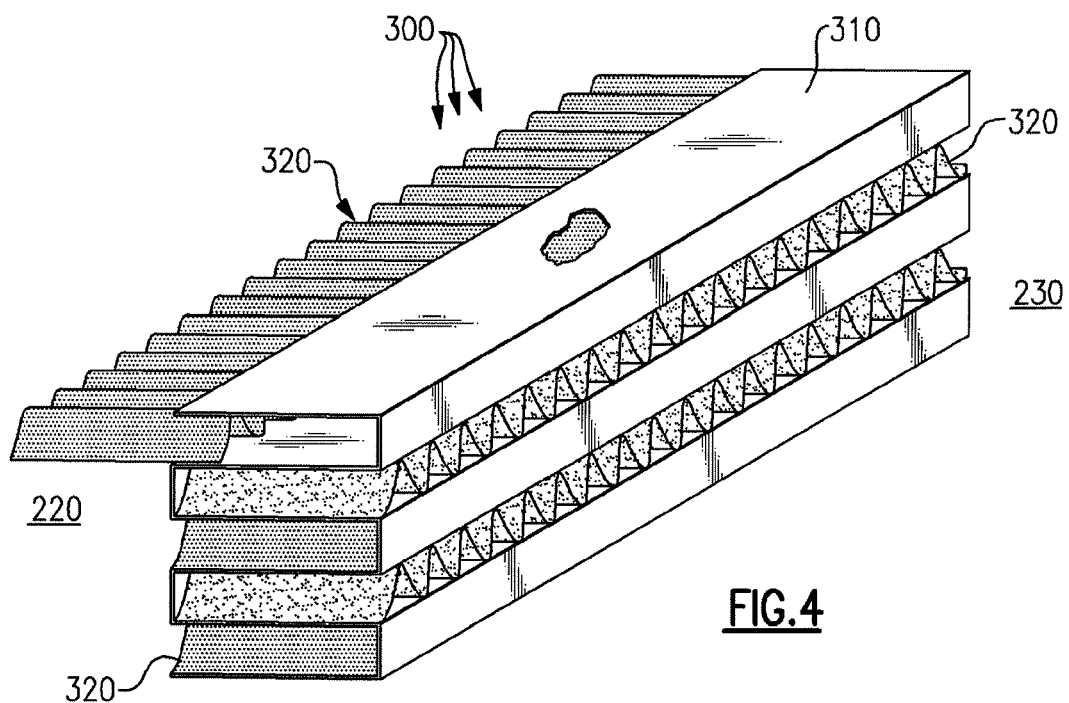
FIG. 4 is a schematic view of the combination particle and AMC filter illustrating the filter pleat construction with a corrugated separator made with activated material, in accordance with an embodiment of the present invention.

FIG. 4 is a schematic view of the combination particle and AMC filter 300 illustrating the filter pleat construction with a corrugated separator made with activated material, in accordance with an embodiment of the present invention. Corrugated separators with activated material 320, and filter media 310 are shown. The air flow in 220, and air flow out 230 are also shown. In this case, the gaseous AMCs are removed both by the diffusion of the AMC in the air stream to the activated material, as well as by the direct contact of the AMC with the activated material. Since diffusion is generally a slower mechanism for removal of gaseous AMC than direct contact, this type of construction, where diffusion can be the main mechanism for AMC removal, can be favored for air streams with low concentrations of the gaseous contaminant, e.g., clean rooms.

Figure 5:
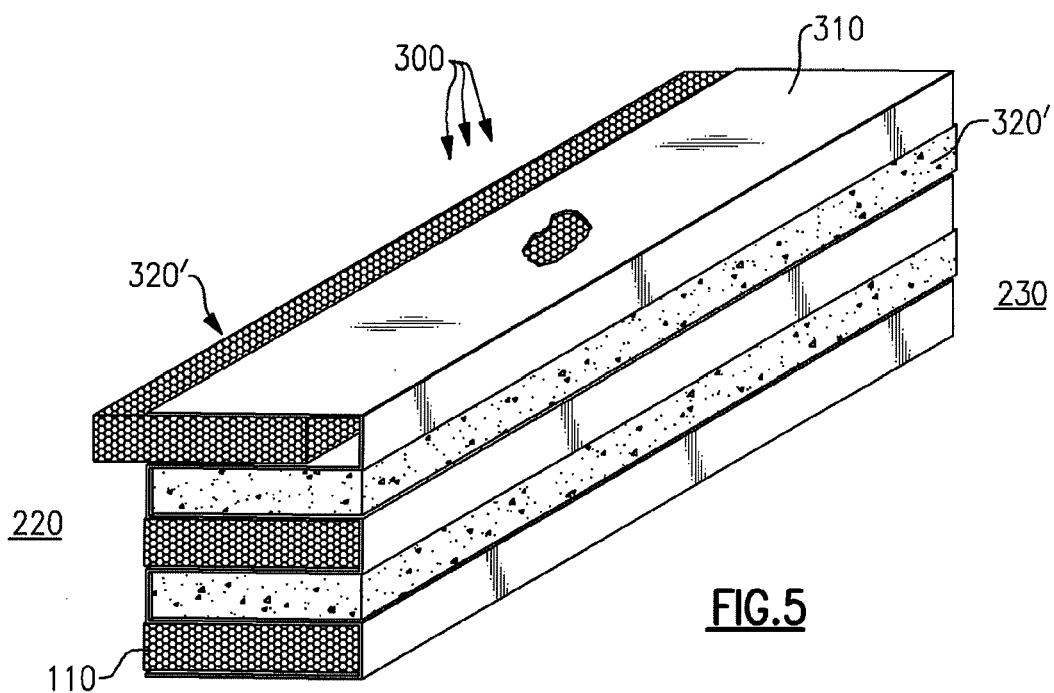
FIG. 5 shows a schematic view of the combination particle and AMC filter illustrating filter pleat construction with rectangular slab activated material separators for rectangular pleats, in accordance with an embodiment of the present invention.
Figure 6:
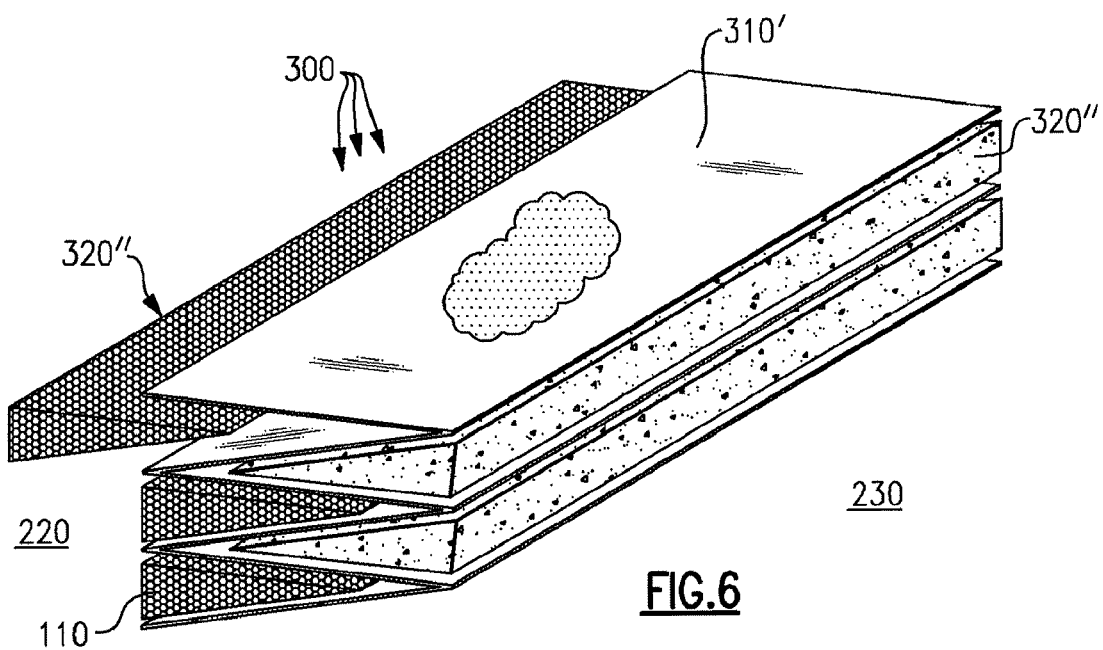
FIG. 6 shows a schematic view of the combination particle and AMC filter illustrating filter pleat construction wedge shaped activated material separators for triangular pleats, in accordance with an embodiment of the present invention.

In accordance with an alternative embodiment of the present invention, the corrugated separators may be replaced with porous slabs (of various shapes and sizes) of the activated material. FIG. 5 shows a schematic view of the combination particle and AMC filter 300 illustrating filter pleat construction with rectangular slab activated material separators for rectangular pleats, in accordance with an embodiment of the present invention. FIG. 6 shows a schematic view of the combination particle and AMC filter 300 illustrating filter pleat construction with wedge shaped activated material separators for triangular pleats, in accordance with an embodiment of the present invention. FIG. 5 shows rectangular-shaped separators with activated material 320', and the filter media 310. FIG. 6 shows triangular-shaped separators with activated material 320", and the filter media 310'. The air flow in 220, and air flow out 230 are also shown in both Figs.

As shown in FIGS. 5 and 6, the cross section of these slabs may be rectangular or triangular resulting in either a rectangular or triangular "V" shaped filter pleat. In other words, the porous slab can provide the separation instead of the corrugations as shown in FIGS. 3-4. In this case the air stream will pass through the porous slabs, and the intimate contact between the air stream and the activated material will remove the AMCs. The rectangular version 320' shown in FIG. 5 can have a larger capacity for activated material and hence greater capacity for AMC removal. The "V" shape version shown in FIG. 6 tend to have lower resistance to air flow and hence may be more energy efficient, although with lower capacity for AMC removal. Both options rely mainly on the direct contact between the air flow and the activated material, and can be capable of removing larger concentrations of AMCs than the configurations shown in FIGS. 3-4. Hence the configurations shown in FIGS. 5-6 may be favored in Indoor Air Quality, Chemical Labs, Industry etc. where the concentrations of AMCs are generally high.

The activated material separators of an embodiment of the present invention can be manufactured by machining, or by molding, extruding or casting the activated material. The activated material may also be dispersed and formed into a foam where one needs a flexible construction for the combination particle and AMC filter 300.

In accordance with an alternative embodiment of the present invention, activated material separators may be made from hollow containers made from mesh or screens (e.g., made out of plastic), and shaped like corrugated or other shaped separators. These containers can be filled with an activated material (e.g., in the form of pellets) before being used as separators, as described herein. For example, activated material separators shown in FIGS. 5 and 6 can be made from containers with open mesh sides in the same respective shape as those activated material separators 320', 320". The activated material separators can be filled with the activated material as illustrated in FIGS. 7 and 8.

Figure 7:
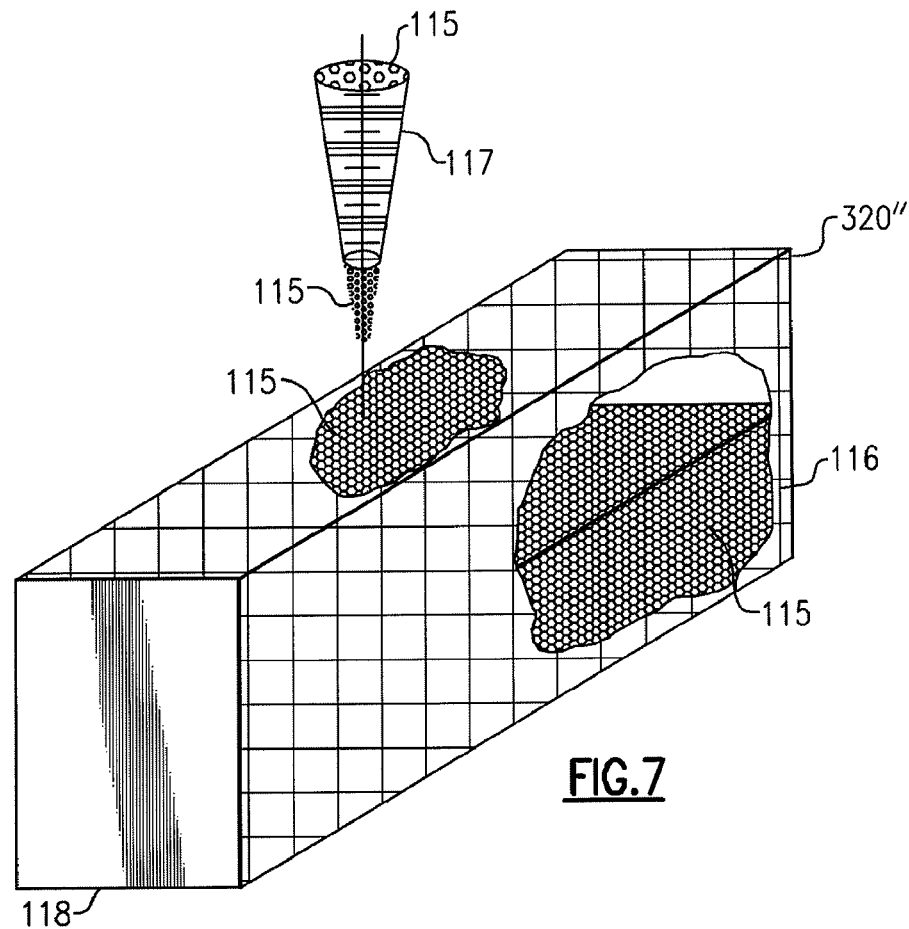
FIG. 7 shows an activated material separator in a rectangular block form being filed with activated material, in accordance with an embodiment of the present invention.

FIG. 7 shows an activated material separator 320''' in a rectangular block form being filed with activated material 115, in accordance with an embodiment of the present invention. The activated material 115 is shown in a cone-shaped container 117. This cone-shaped container 117 is shown filling the rectangular-shaped activated material separator 320''' (which is made of mesh) with the activated material 115. The blind end 118 of the rectangular-shaped activated material separator 320''' is also shown.

Figure 8:
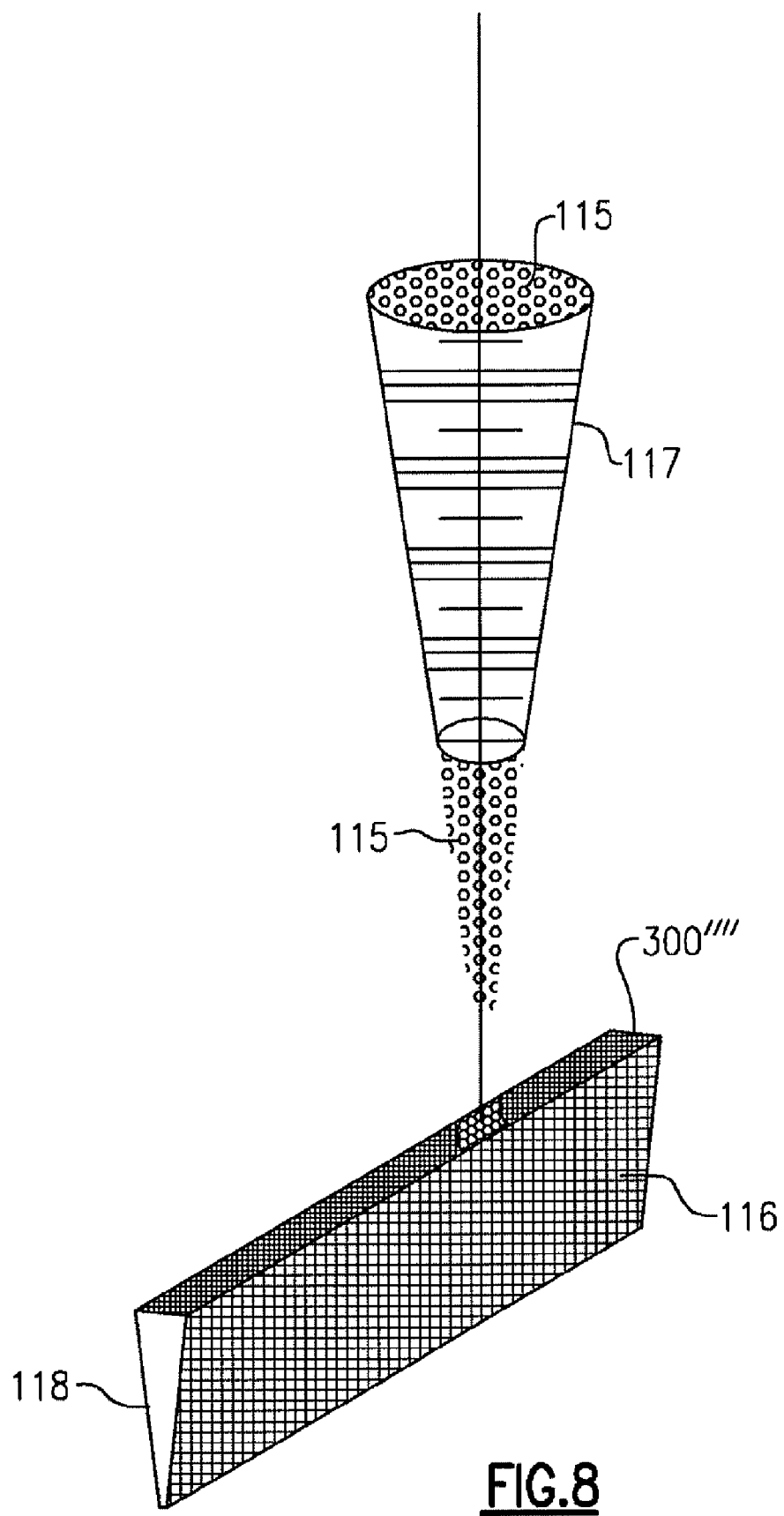
FIG. 8 shows an activated material separator in a triangular block form being filed with activated material, in accordance with an embodiment of the present invention.

FIG. 8 shows an activated material separator 320'''' in a triangular block form being filed with activated material 115, in accordance with an embodiment of the present invention. The activated material 115 is shown in a cone-shaped container 117. This cone-shaped container 117 is shown filling the triangular-shaped activated material separator 320'''' (which is made of mesh) with the activated material 115. The blind end 118 of the triangular-shaped activated material separator 320'''' is also shown.

As shown in FIGS. 7-8, the air can come in intimate contact with the activated material 115 inside the rectangular-shaped activated material separator and/or triangular-shaped activated material separator 320''', 320'''' and be removed. These activated material separators 320''', 320'''' may be removed from an installed combination particle and AMC filter 300, and replaced or refilled and replaced without replacing the entire filter 300 saving costs to the user. This option may be favored in locations with very high concentration of AMC requiring frequent replacement of the activated material, e.g., spray painting, solvent manufacture, etc. Since the life of activated material is always much shorter than the particle removing media, in this configuration, just the activated material can be replaced by replacing the rectangular-shaped activated material separator and/or triangular-shaped activated material separator 320''', 320'''' without replacing the entire filter.

In accordance with an embodiment of the present invention, the effectiveness of AMC removal may be enhanced (e.g., doubled) by using activated material on both up and down stream side (i.e., upstream is inlet and downstream is exit from filter) of the combination particle and AMC filter 300. Further, since the construction will work with any filter media, virtually any particle efficiency of the combination particle and AMC filter 300 can be achieved. In practice, one expects that filters typically needed for very clean spaces, such as cleanrooms, will use HEPA and ULPA filter media in the construction described above. Lower efficiency filters will use lower efficiency media in the ASHRAE or HVAC range of performance. In all cases, the effectiveness of removing AMC will be dependent on the flow rates, and hence the residence time for contact between the air stream and the activated material. Although no industry standard currently exists for measuring the effectiveness of AMC removal, over 90% removal can be possible at very low flow rates through activated material.

While the invention is susceptible to various modifications, and alternative forms, specific examples thereof have been shown in the drawing and are herein described in detail. It should be understood, however, that the invention is not to be limited to the particular forms or methods disclosed, but to the contrary, the invention is to cover all modifications, equivalents and alternatives falling within the spirit and scope of the claimed invention.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A combination particle and air borne molecular contaminant filter comprising:
    a. a filter media, wherein said filter media comprises a sheet with at least a first and a second pleat, wherein each of said first and said second pleat forms a first portion of said filter media on one side of the pleat and a second portion of said filter media on the other side of the pleat; and
    b. at least a first separator and a second separator, wherein said first separator and second separator are noncontiguous and comprise an activated material, wherein said first separator is structured to reside between said first portion and said second portion of said first pleat and said second separator is structured to reside between said first portion and said second portion of said second pleat, wherein each of said at least said first separator and said second separator is corrugated and comprises a plurality of apex portions and base portions, said plurality of apex portions of said first separator is structured to substantially reside in a first plane, said plurality second separator is structured to substantially reside in a second plane, and said first plane and said second plane are parallel to air flow through said filter.

2. The combination particle and air borne molecular contaminant filter of claim 1, wherein said plurality of apex portions and base portions of said first separator and said plurality of apex portions and base portions of said second separator are structured to create channels within said filter through which air may flow.

3. A combination particle and air borne molecular contaminant filter comprising:
    a. filter media, wherein said filter media comprises a sheet with at least a first and a second pleat, wherein each of said first and said second pleat forms a first portion of said filter media on one side of the pleat and a second portion of said filter media on the other side of the pleat; and
    b. at least a first separator and a second separator, wherein said first separator and second separator are noncontiguous and comprise a semi-permeable container structured to contain an activated material, wherein said first separator is structured to reside between said first portion and said second portion of said first pleat and said second separator is structured to reside between said first portion and said second portion of said second pleat, wherein each of said at least said first separator and said second separator is removably installed within said filter, each of said at least said first separator and said second separator is corrugated and comprises a plurality of apex portions and base portions, said plurality of apex portions of said first separator is structured to substantially reside in a first plane said plurality of apex portions of said second separator is structured to substantially reside in a second plane, and said first plane and said second plane are parallel to air flow through said filter.

4. The combination particle and air borne molecular contaminant filter of claim 3, wherein said plurality of apex portions and base portions of said first separator and said plurality of apex portions and base portions of said second separator are structured to create channels within said filter through which air may flow.

* * * * *